June 25, 1957 H. FAHLBUSCH ET AL 2,796,841
TRUCK ARRANGEMENT
Filed Dec. 7, 1955
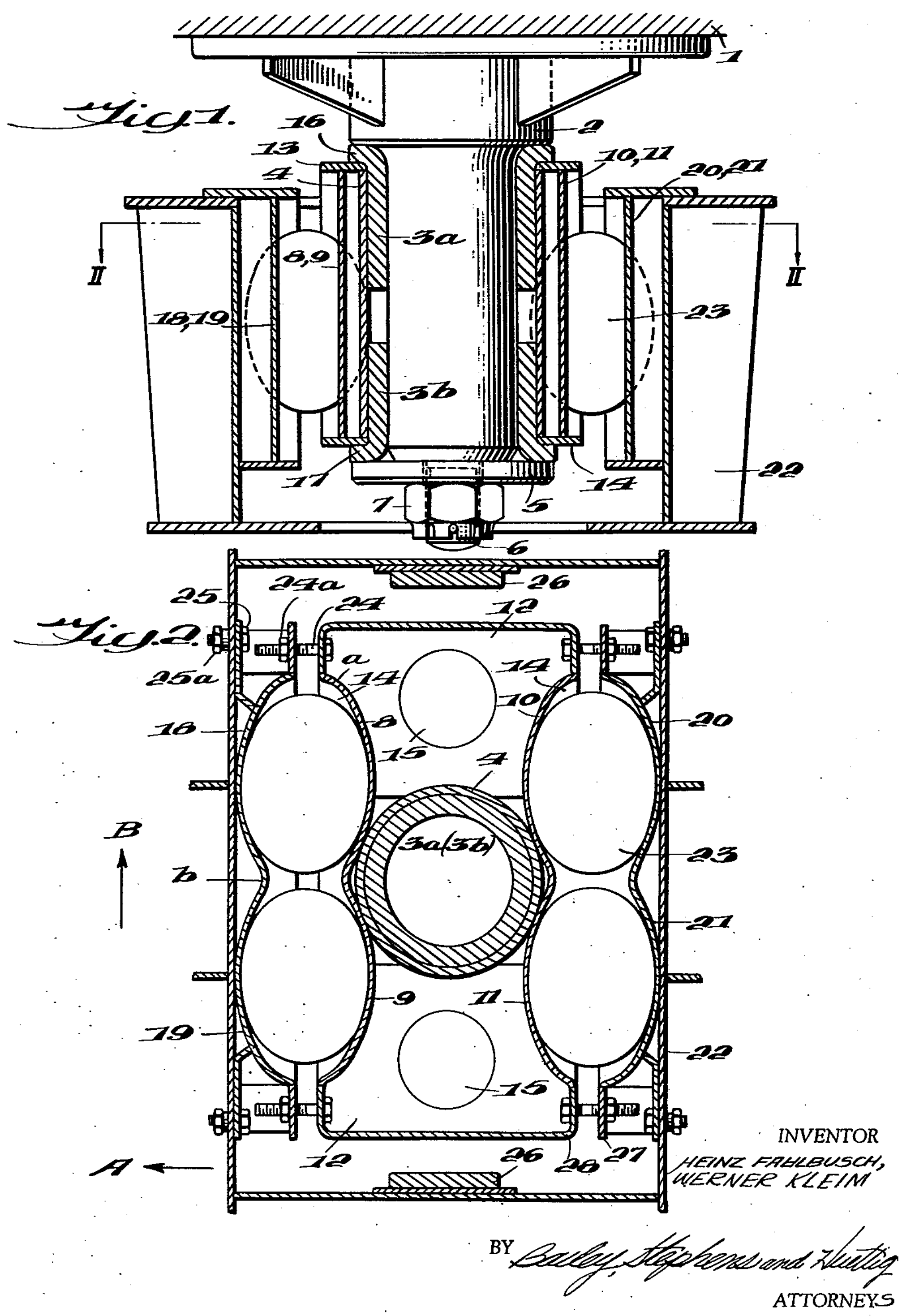
INVENTOR
HEINZ FAHLBUSCH,
WERNER KLEIM
BY Bailey, Stephens and Huettig
ATTORNEYS United States Patent Office 2,796,841
Patented June 25, 1957

2,796,841
TRUCK ARRANGEMENT

Heinz Fahlbusch and Werner Kleim, Nurnberg, Germany, assignors to Maschinenfabrik Augsburg-Nürnberg A. G., Nurnberg, Germany Application December 7, 1955, Serial No. 551,567
Claims priority, application Germany December 11, 1954
6 Claims. (Cl. 105—199)

This invention relates to certain improvements in or relating to articulated truck arrangements without swing bolster adapted to be jointed to the carriage body or superstructure of rail cars.

In truck arrangements, the truck is guided by the king pin which in general is secured to the carriage body, in such a way that forces in a longitudinal direction of the vehicle are transmitted without substantial play between the truck and the carriage body, that the king pin is able to carry out vertical dipping motions, and that elastic relative motions in a transverse direction of the vehicle are possible between the carriage body and the truck.

It is known to arrange block-shaped rubber bodies between the king pin and the frame of the truck. Said rubber blocks are arranged with initial stress on both sides of the king pin and in diametrically opposed positions in a longitudinal direction of the vehicle between the king pin and the frame of the truck. Forces in a longitudinal direction of the vehicle are transferred without substantial play between the king pin and the truck frame, since the rubber blocks in a longitudinal direction of the vehicle are subjected to tension and compression stresses only and show little resilience with respect to such stresses. Dipping motions of the king pin and relative motions in a transverse direction of the vehicle between the king pin and the truck are permitted by shear-stress deformation of the rubber blocks. This arrangement is not fully satisfactory, for the rubber blocks can be dimensioned only in such a way that either longitudinal forces are transmitted substantially without play, while the possibility of motion in a transverse direction of the vehicle and the possibility of motion in a vertical direction is very limited, or that sufficient freedom for motion in a transverse direction of the vehicle and in a vertical direction is provided while the transmission of longitudinal forces in this case is possible only with an inadmissibly large play.

It is an object of the present invention to provide between trucks without swing bolster and the carriage body or superstructure of the rail cars a pivoted connection which ensures a reliable and satisfactory guiding of the truck while having a simple construction.

With this and further objects in view, according to the present invention the elastic bodies or blocks are provided in the form of substantially spherical roller bodies sandwiched between roller beds connected with the king pin and with the truck frame, respectively, and permitting substantially free rolling of the roller bodies in a vertical direction and a rolling against progressively increasing elastic forces in a transverse direction of the vehicle, while permitting a small compressive deformation only of the roller bodies in a longitudinal direction of the vehicle.

According to the invention the free or non-restrained rolling of the roller bodies in a vertical direction and a progressively resilient rolling of the roller bodies in a transverse direction of the vehicle is permitted by providing the roller surfaces in the form of segments of upright cylinders which are increasingly curved towards their vertical edges. The roller bodies are arranged between the roller beds with initial tension. Thus an elastic transfer of the longitudinal forces with small play is achieved and the roller bodies are prevented from falling through between the roller beds. The arrangement is particularly advantageous if the roller bodies are arranged in pairs between the complementary roller bed surfaces on both sides of the king pin in the longitudinal direction of the vehicle. The horizontal relative motions between the king pin and the truck are advantageously limited by abutments.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a vertical section, in a longitudinal direction of the vehicle, of a center bearing having the invention applied thereto, Fig. 2 is a section on line II—II of Fig. 1.

Referring now to the drawings in greater detail, it will be seen that the king pin 2 is secured to the bottom of the carriage body 1 and seated in a transversely split sleeve *3a*, *3b*, preferably consisting of a molded laminated plastic consisting of paper or fabric, which has been solidified by means of phenoplasts, e. g., phenolic and cresylic resin, such as for instance, a material known in the market by the trade name of "Ferrozell." The king pin 2 is free to carry out rotary motions in the sleeve *3a*, *3b*, but prevented from carrying out vertical dipping motions, by a bearing plate 5 and a crown nut 7 screwed on the threaded lower end 6 of the king pin 2. The sleeve *3a*, *3b* is held against rotation in a sleeve 4 having connected to it roller bed members 8—11 stiffened by ribs 12, and upper and lower bordering surfaces 13, 14. In order to reduce the weight, the stiffening ribs 12 are provided with recesses 15. The sleeve *3a*, *3b* has upper and lower flanges 16, 17 engaging over the bordering surfaces 13, 14 of the roller bed members 8—11 which are arranged in pairs on both sides of the king pin 2 so as to be opposed to each other in a longitudinal direction A of the vehicle. Adjacent to the roller bed members 8—11, roller bed members 18—21 are connected to the bogie frame 22. Prestressed roller bodies 23 of an elastic material, for instance rubber, are arranged between the roller bed members 8—11 and 18—21.

The roller beds for each roller body are shaped in the form of segments of vertical cylinders whose curvature increases towards the vertical edges. The roller bed members on both sides of the king pin are interconnected in pairs for the sake of a simpler manufacture and assembling, i. e. the roller bed member 8 is connected or formed integral with the roller bed member 9, and the roller bed member 18 is connected with the roller bed member 19.

The center bearing is mounted as follows:

The roller bed members are drawn together, by assembling bolts 24 and nuts 24*a*, about as much as the material of the elastic roller bodies 23 permits. The center bearing may then be inserted into the bogie frame 22 before putting on the car body 1. The screw bolts 24 and nuts 24*a* are then removed again so that the roller bed members 18—21 engage the bogie frame 22 as the roller bodies are released. Then the roller bed members 18—21 are screwed to the bogie frame 22 by means of screw bolts 25 and nuts 25*a*. Advantageously the elastic roller bodies are dimensioned in such a way that they are pre-stressed between the roller bed surfaces 8—11 and 18—21, if the roller bed surfaces 18—21 engage the bogie frame 22.

If the car body carries out vertical relative motions in respect to the truck frame, the king pin with the roller bed surfaces 8—11 will dip in the bogie frame 22 and the roller bodies 23 will roll on the roller bed surfaces 8—11 and 18—21. Here only the resistance of the rolling friction has to be overcome. Since this resistance is very small, the dipping motions of the king pin take place substantially unhindered. If the car body tends to carry out relative motions with respect to the truck in the longitudinal direction A of the vehicle, the roller bodies 20 on one side of the king pin will be compressed (in a longitudinal direction of the vehicle) while the roller bodies of the opposite side are allowed to expand. Since this is possible to a small extent only, the longitudinal forces between the car body and the truck are elastically transferred with a small play only. If the car body carries out relative motions with respect to the truck in a transverse direction B of the vehicle, the roller bodies 23 will roll off in a transverse direction of the roller bed surfaces 8—11 and 18—21, being increasingly compressed owing to the shape of the roller bed surfaces, with the result that a progressively increasing elastic force is opposed to the transverse swinging.

As will be seen from Fig. 2, the car body with the king pin is permitted to swing laterally relatively to the truck, with simultaneous rolling of the roller bodies, by an amount defined by engagement of the roller bodies with the respective diagonally opposed edges (for instance *a*, *b* of the roller bed surfaces 8, 18). Further transverse motions then are possible only by shear-stress deformation of the roller bodies. This means a progressive increase of the elastic forces opposed to the transverse motions.

In order to reduce the transverse motions to an admissible measure, elastic lateral abutments or stop faces 26 are provided on the truck frame for engagement with the stiffening ribs 12. The longitudinal motions are limited by abutments or stop faces 27, 28 which are connected with the roller bed surfaces of the roller bodies and which also serve as abutments for the assembling bolts 24 and their nuts 24*a*.

The arrangement of the roller bodies 23 is shown by way of example only. In some instances even a single elastic roller body may be sufficient on either side (in a longitudinal direction of the vehicle) of the king pin or, where a very long vertical guidance is desirable, a plurality of roller bodies may be provided in a superposed arrangement.

While the invention has been described in detail with respect to a now preferred example and embodiment of the invention it will be understood by those skilled in the art after understanding the invention that various changes and modifications may be made without departing from the spirit and scope of the invention and it is intended therefore, to cover all such changes and modifications in the appended claims.

We claim:

1. A bearing arrangement for pivotally mounting a truck without swing bolster on the car body of rail cars, comprising a bogie frame, a king pin, bearing sleeve means for supporting the king pin, pairs of roller bed members connected to said bearing sleeve means and to the bogie frame, respectively, and elastic roller bodies sandwiched between said roller bed members which are shaped so that the roller bodies are permitted to roll substantially freely in a vertical direction and to roll against a progressively increasing elastic counterforce in a transverse direction of the car while only a small compressive deformation of the roller bodies is permitted in a longitudinal direction of the car.

2. A bearing arrangement for pivotally mounting a truck without swing bolster on the car body of rail cars, comprising a bogie frame, a king pin, bearing sleeve means for supporting the king pin, pairs of roller bed members connected to said bearing sleeve means and to the bogie frame, respectively, and elastic roller bodies sandwiched between said roller bed members which are shaped as segments of upright cylinders progressively curved towards their vertical edges in such a way that the roller bodies are permitted to roll substantially freely in a vertical direction and to roll against a progressively increasing elastic counterforce in a transverse direction of the car, while only a small compressive deformation of the roller bodies is permitted in a longitudinal direction of the car.

3. A bearing arrangement for pivotally mounting a truck without swing bolster on the car body of rail cars, comprising a bogie frame, a king pin, bearing sleeve means for supporting the king pin, pairs of roller bed members connected to said bearing sleeve means and to the bogie frame, respectively, and elastic roller bodies sandwiched with initial stress between said roller bed members which are shaped so that the roller bodies are permitted to roll substantially freely in a vertical direction and to roll against a progressively increasing elastic counterforce in a transverse direction of the car while only a small compressive deformation of the roller bodies is permitted in a longitudinal direction of the car.

4. A bearing arrangement for pivotally mounting a truck without swing bolster on the car body of rail cars, comprising a bogie frame, a king pin, bearing sleeve means for supporting the king pin, pairs of roller bed members connected to said bearing sleeve means and to the bogie frame, respectively, and elastic roller bodies sandwiched between said roller bed members which are shaped so that the roller bodies are permitted to roll substantially freely in a vertical direction while only a small compressive deformation of the roller bodies is permitted in a longitudinal direction of the car and a relative motion between the car body and the truck frame in a transverse direction of the car is permitted up to a predetermined extent by rolling of the roller bodies between the roller bed members and beyond said extent by shear-stress deformation of the roller bodies.

5. A bearing arrangement for pivotally mounting a truck without swing bolster on the car body of rail cars comprising a bogie frame, a king pin, bearing sleeve means for supporting the king pin, pairs of roller bed members connected to said bearing sleeve means and to the bogie frame, respectively, and elastic roller bodies arranged in pairs on both sides of the ping pin, in a longitudinal direction of the car, and sandwiched between said roller bed members which are shaped so that the roller bodies are permitted to roll substantially freely in a vertical direction and to roll against a progressively increasing elastic counterforce in a transverse direction of the car while only a small compressive deformation of the roller bodies is permitted in a longitudinal direction of the car.

6. A bearing arrangement for pivotally mounting a truck without swing bolster on the car body of rail cars comprising a bogie frame, a king pin, bearing sleeve means for supporting the king pin, pairs of roller bed members connected to said bearing sleeve means and to the bogie frame, respectively, elastic roller bodies sandwiched between said roller bed members which are shaped so that the roller bodies are permitted to roll substantially freely in a vertical direction and to roll against a progressively increasing elastic counterforce in a transverse direction of the car while only a small compressive deformation of the roller bodies is permitted in a longitudinal direction of the car, and abutments limiting the horizontal relative motions between the rail car and the truck.

References Cited in the file of this patent

UNITED STATES PATENTS

| | | |
|---|---|---|
| 1,224,684 | Sullivan | May 1, 1917 |
| 1,751,065 | Alden | Mar. 18, 1930 |
| 2,034,504 | Bugatti | Mar. 17, 1936 |
| 2,499,087 | Bourdon | Feb. 18, 1950 |